March 31, 1970 H. DUERINGER 3,504,117

LIGHT VALVE IMAGE PROJECTION WITH TRAPEZOIDAL WAVE
FOCUS-DEFOCUS BEAM CONTROL FOR FLOOD EFFECT

Filed Jan. 6, 1967 2 Sheets-Sheet 1

Inventor

Heinrich Dueringer

By Pierce, Scheffler & Parker

Attorneys

March 31, 1970 H. DUERINGER 3,504,117

LIGHT VALVE IMAGE PROJECTION WITH TRAPEZOIDAL WAVE FOCUS-DEFOCUS BEAM CONTROL FOR FLOOD EFFECT

Filed Jan. 6, 1967 2 Sheets-Sheet 2

Inventor

Heinrich Dueringer

By Pierce, Scheffler & Parker

Attorneys

United States Patent Office 3,504,117
Patented Mar. 31, 1970

3,504,117

LIGHT VALVE IMAGE PROJECTION WITH TRAPEZOIDAL WAVE FOCUS-DEFOCUS BEAM CONTROL FOR FLOOD EFFECT

Heinrich Dueringer, Watt-Regensdorf, Switzerland, assignor to Eidophor AG, Glarus, Switzerland Filed Jan. 6, 1967, Ser. No. 607,817
Claims priority, application Switzerland, Nov. 16, 1966, 16,440/66
Int. Cl. H04n *3/16*
U.S. Cl. 178—7.5 4 Claims

ABSTRACT OF THE DISCLOSURE

This invention concerns the use of a schlieren-optical system for projecting on a large screen a reproduction of an image which is formed by an electron beam directed at a deformable surface, such as an oil film. With images which comprise a sequence of image points disposed randomly in time and place, the beam does not produce a complete scanning raster and there is, therefore, no background electrostatic charge to give persistence to image points. The invention therefore provides a secondary electrostatic charge around each image point to give the desired persistence.

Figure 1:
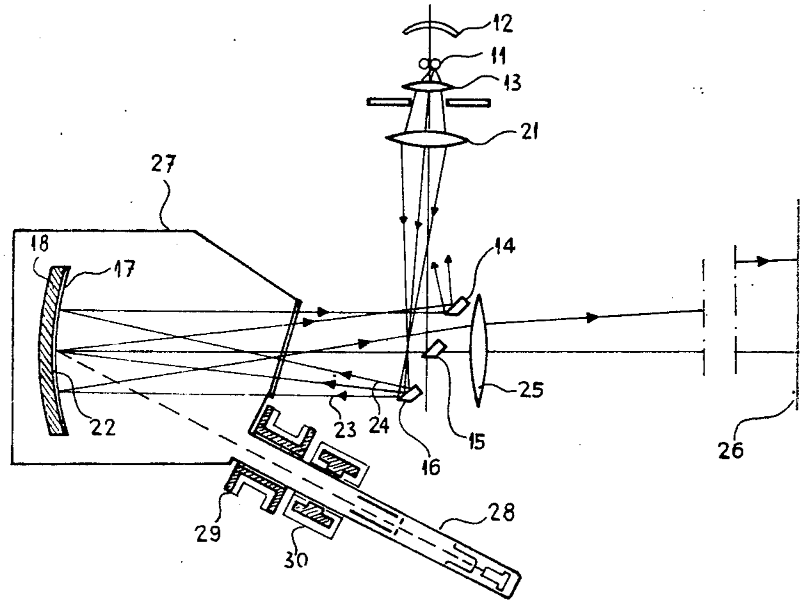

This invention relates to a method of reproducing an image composed of a sequence of image points scanned rondomly in time and place.

It has already been proposed to use a schlieren-optical system for the reproduction of televised images, particularly for projecting the same on a large screen. In a system of such a kind the light from a projection lamp is reflected by mirrored bars onto a concave mirror which returns the light to the mirrored bars. The concave mirror is provided with an oil film which is deformable by electrostatic charges and the television image that is to be projected is traced on the image area of the oil film by an electron beam which is modulated according to the picture, thus causing the oil film to be deformed by the electrostatic charges deposited thereon by the electron beam and to produce a diffraction pattern of the light from the mirrored bars, that can be projected to reproduce a picture image.

The modulation of an oil film according to a picture by an electron beam is possible because in forming a television image the modulated electron beam traverses the entire image area in consecutive lines and scans out a raster, the image scan being repeated at a frequency which is too high to be visually perceived, for instance at a frequency of 50 cycles per second. Consequently, the entire image area outside the momentarily modulated image point is provided with a uniform stationary electrostatic charge which prevents the oil film from laterally yielding to the transient pressure when the individual image points in a line are traversed by the electron beam. The image therefore appears as a local modulation in depth on the oil film and can be made visible by a dark field optical system.

Apart from images (television images) that are traced out by an electron beam in a line-for-line scan, images can also be traced by an electron beam that is deflected in any arbitrary manner, known as a random scan, so that such images are composed of individual image points scanned in any sequence in time and place. Such images are obtained for instance in the reproduction of radar and computer signals. These are composed of individual lines which may be visually stationary, for instance orthogonal or polar coordinate grids, topographical lines, numbers, letters or any kind of graphical characters, numerical tables, texts, and so forth, or they may visually move, such as paths of motion, representations of mathematical and physical functions with continuously changing parameters and so forth. Such line images could not in the past be reproduced by a schlieren-optical system and projected for instance on a large screen because of the absence of an overall electrostatic surface charge on the oil film. The electrostatic pressure generated by the arbitrarily deflected electron beam would therefore have caused the oil film modulation to disperse at the image points.

In order to permit such images that are traced in single lines or that are built up of a random sequence of spots to be optically reproduced by a schlieren-optical system, for instance for projection on a large screen, an image converter is needed for transforming the radar and/or computer signals for random electron beam scanning into conventional television signals for line scanning. So-called image converter tubes of the storage type are known in which the image is traced on a storage surface by a randomly deflected beam and then scanned by a line scanning beam which generates the television signals.

The optical reproduction of images by means of a schlieren-optical system with the aid of an image converter storage type tube for converting an image traced in a random sequence of image points requires considerable apparatus of great complexity which is difficult to operate and liable to develop faults. The present invention overcomes these difficulties.

The invention relates to a method of reproducing an image composed of a sequence of image points which in time and location follow in random succession, wherein the surface of a light modulating film in a schlieren-optical system is deformed by electrostatic charges deposited at discrete points on said surface and used for diffracting the light, and which consists in that each individual image point is produced by a deposited charge confined to the area of said image point and that a neutralising charge is deposited on the surface of the modulating film at least in the environment of said image point, the complete scanning cycle for forming the image being repeated at a constant repetition frequency and the surface deformation at each image point neutralised or at least substantially nullified during the interval between each scan.

When the image point travels, the neutralising charge travels at least substantially coincidently with the image tracing charge. Preferably the image tracing charge may be deposited intermittently or pulsatingly at the image point. The neutralising charge may be generated by defocusing the electron beam which also deposits the image forming charge. Preferably the neutralising charge may be generated by alternately underfocusing and overfocusing the image forming electron beam. This alternating underfocusing and overfocusing may with advantage be effected by a trapezoidal voltage applied to a focus modulating system in the cathode ray tube, the focus of the electron beam passing through the image plane at a speed determined by the steepness of the flank of the trapezoidal voltage. The frequency of this trapezoidal voltage is so chosen that it has no common submultiple with the image repetition frequency.

Figure 2:
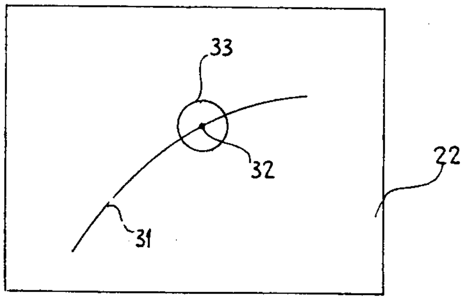
Figure 3:
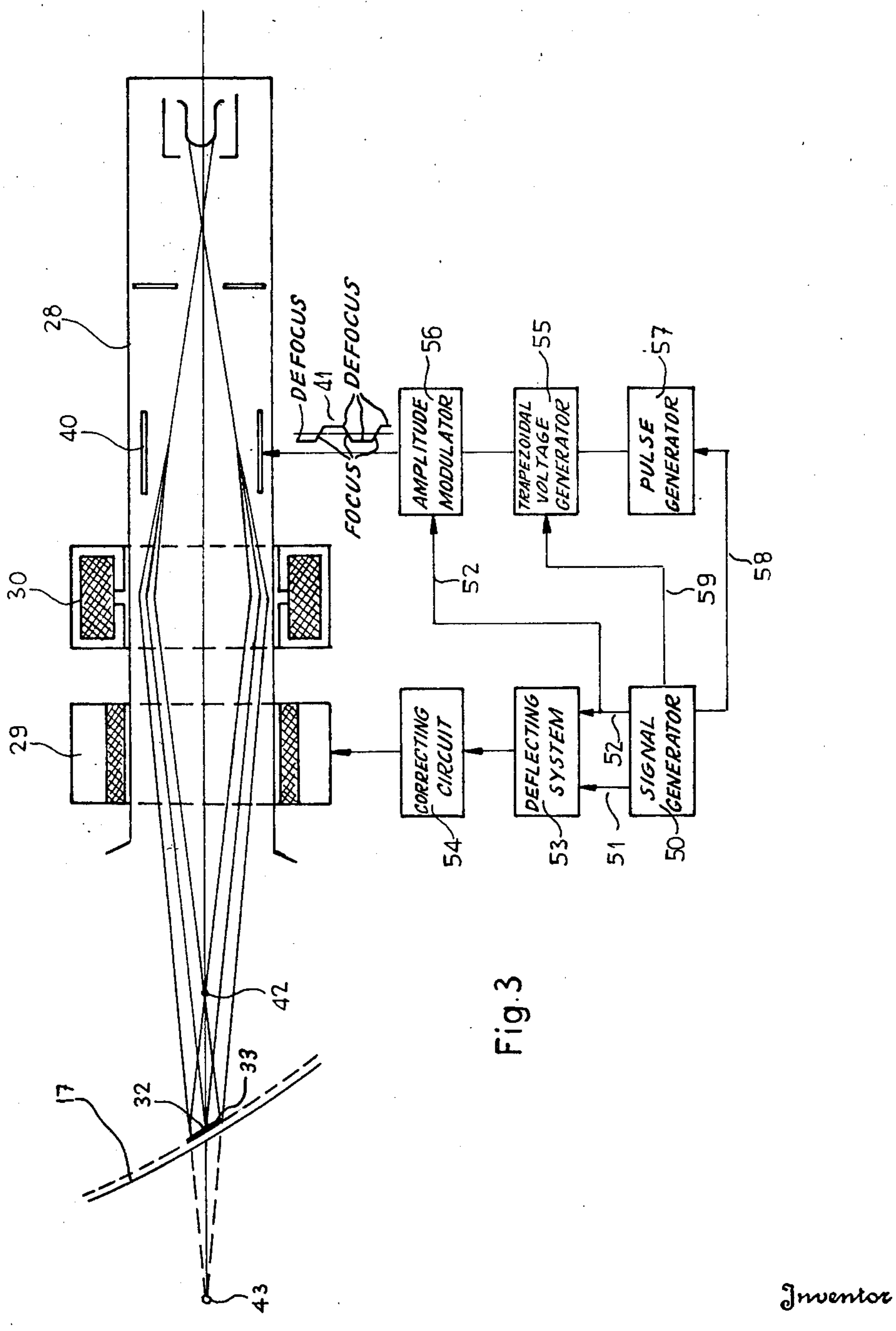

An embodiment of the invention will be hereunder described with reference to the drawings in which:

FIG. 1 schematically illustrates apparatus comprising a schlieren-optical system for the reproduction of images traced on a light modulating film by deposited electrostatic charges, FIG. 2 is the image area on the modulating film showing a single image point, FIG. 3 is a schematic representation of a system for controlling the electron beam.

FIG. 1 illustrates only the principle of construction of an optical modulating system. The light source is a gas discharge lamp 11 with a reflector 12 behind the lamp and a condenser 13. The light falls on mirrored bars 14, 15, 16 and is reflected by them onto the modulating medium 17 which is distributed in the form of a thin film on the surface of a concave mirror 18. A lens 21 images approximately the plane of the condenser 13 on the modulating film within the image area 22 defined by the marginal rays 23 and 24. The mirrored bars 14 to 16 which form a rigid aggregate system are located in the centre of the sphere defined by the concave mirror 18 so that the mirror images the bars upon themselves. Consequently, so long as the modulating film 17 is not deformed the light rays reflected by the mirrored bars are returned by the concave mirror and reflected back by the mirrored bars to the source. However, if the surface of the modulating film within the image area is deformed, then the ray reflected at each point of the image area will be deflected from its normal path according to the magnitude of the deformation. Deflected rays pass between the mirrored bars on to a projection objective 25 which images the image area 22 on a screen 26.

For the purpose of modulating the image area 22 by means of electrostatic charges, the concave mirror is located inside an evacuated envelope 27 combined with a cathode ray tube 28 fitted with a deflecting coil system 29 and a focusing coil system 30, the axis of the tube pointing towards the centre of the image area. Arrangements of this kind are conventionally used for the projection of televised pictures, the cathode ray tube 28 being controlled by television signals in such a way that the electron beam scans the image area in consecutive lines. The electron beam is so modulated by the video signal that the resultant distribution of charges on the modulating film forms a regular raster, the amplitude of the raster at different points of the image varying in accordance with the distribution of light and shade in the picture that is to be projected.

By using the method according to the present invention an arrangement such as that illustrated in FIG. 1 can also be used for the reproduction of pictures composed of points which are randomly distributed in place and time by the image forming electron beam being guided accordingly.

FIG. 2 represents the image area 22 in FIG. 1. It is assumed the image is a curve 31. This curve can be traced in *x*, *y* coordinates with continuously changing parameters and is understood to consist of a sequence of points of which a single point 32 is shown in the drawing. For the generation of this particular point the electron beam is used to deposit at the location of this image point 32 a limited charge, whereas a second electron beam, or as will yet be described the same electron beam, deposits a neutralising charge which creates a neutralising field 33 in the environment of the image point 32. This neutralising charge causes the surface of the modulating film to be stabilised against distortion due to the lateral spreading of the deformation at the image point. At the same time the neutralising charge assists in the smoothing out of the image point deformation by the surface tension of the modulating film. As the image point 32 moves along the curve 31 the neutralising charge travels at least approximately coincidently with the image tracing charge. During this motion of the image point the image tracing charges may be deposited continuously. However, it is better to deposit the image tracing charges intermittently or at least by pulsations. Since the surface deformation at each image point rapidly fades the entire image tracing cycle for maintaining the image must be repeated at a constant repetition frequency, the neutralising charge and the repetition frequency being so matched that in the course of each cycle the surface deformation at each image point will have been nullified or at least considerably reduced and that the repetition frequency is sufficiently high to produce a picture that is steady and free from flicker to the observer's eye.

If for generating a discontinuous sequence of image points the image tracing charge is intermittently deposited whilst the electron beam continuously scans, then the neutralising charge may be provided by defocusing the electron beam during the intervals. Alternatively the neutralising charge may be provided by alternately over- and underfocusing the electron beam, the charge deposited by the electron beam being confined to the image point as the focus of the beam passes through the image plane and the surface deformation of the modulating film being produced at this instant. This procedure is illustratively represented in FIG. 3 which shows the cathode ray tube 28 in FIG. 1 on a larger scale. The electron beam is focused by a focusing coil 30 on the surface of the modulating film 17 to generate an image point 32. By controlling the voltage of the deflecting coil system 29 the image point 32 can be moved in the image plane, i.e. along the surface of the modulating film. For generating the neutralising charge the electron beam is alternately under- and overfocused by the application of a trapezoidal voltage to an electrostatic focus modulating lens 40. According to the amplitude of the trapezoidal voltage the focus of the beam will then travel to and fro between a point 42 within the normal focusing distance and a point 43 outside the normal focusing distance. At the two points 42 and 43 the focus is at least approximately stationary and at these times the charge of the electron beam is deposited on the neutralising field 33 as a neutralising charge. For depositing the image tracing charge the focus passes through the image point 32 at a velocity determined by the steepness of the flank of the trapezoidal voltage 41. The magnitude of the neutralizing field and the charge density in the neutralising field can be varied by controlling the amplitude of the trapezoidal voltage.

The charge density of the neutralising field is sufficiently high to achieve smoothing, that is to say to suppress low frequency surface deformations when the image point charges are deposited. However, the charge density is also subject to an upper limit inasmuch as it must not be high enough to generate surface deformation at the edge of the neutralising field. This can be achieved by decreasing the charge density in the neutralising field towards its edges. If the scanning speed is variable the above requirement can be satisfied either by controlling the current of the neutralising beam in proportion to, or its spot size in inverse proportion to the scanning speed. The size of the spot of the focused beam and the requirement that the charge density distribution should be a sequence of points in the image tracing direction limits the maximum permissable number of points per unit of length along a line that is to be traced. The minimum number of image points per unit of length should not impair the subjective clarity of the pictorial intelligence. In order to avoid this result the image is repeated at a repetition frequency which has no common submultiple with the image point frequency, thereby to generate the physiologically governed impression of a continuous trace. If the image is formed by a plurality of differently positioned writing cycles, then the tracing and neutralising electron beam is blanked out during the positioning cycles.

Control means for the reproduction of pictures consisting of individual characters, such as numbers composed of individual digits, texts consisting of letters, and so forth will be hereunder described, purely by way of example, with reference to FIG. 3. A signal generator 50 fed for instance by a computer supplies positioning signals 51 and image signals 52 to an *x*, *y* deflecting system 53 which controls the deflecting coils 29 of the cathode ray tube 28 through a correcting circuit 54. A trapezoidal voltage generator 55 applies a trapezoidal voltage 41 through an amplitude modulator 56 to the electrostatic focus modulating lens 40 which overfocuses and underfocuses the electron beam in the manner that has already been described. The trapezoidal voltage generator 55 is driven by a pulse generator 57 delivering a pulse frequency containing no common submultiple with the frequency of the image repetition pulses 58 provided by the signal generator 50. From the signal generator 50 the trapezoidal voltage generator 55 receives blanking pulses 59 which stop the trapezoidal voltage generator during the positioning cycles and allow it to operate only during the scanning cycles. The amplitude modulator 56 is controlled by the signal generator 50 according to the image signals 52 and modulates the amplitude of the trapezoidal voltage 41 according to the scanning speed.

The described system permits computer intelligence to be written and optically reproduced, for instance on a large-sized projection screen, by means of the schlieren-optical system. Analogously any kind of intelligence, such as radar intelligence with changing local parameters can be optically represented if the characteristic deflecting signals are fed into the system.

What I claim is:

1. A method of reproducing an image composed of a sequence of image points which follow in random succession in time and place, comprising the steps of scanning an electron beam in a cycle of scans across a surface of a light modulating film in a schlieren-optical system in order to deposit electrostatic charges at discrete image points on said surface so as to deform said surface in accordance with said image, projecting light onto said surface in order to modulate said light in accordance with said deformed surface, confining the charge deposited at each individual image point to the area of said image point, alternately over-focusing and under-focusing the electron beam to produce at least one secondary charge on the surface of said modulating film in the area surrounding each image point, and repeating said cycle of scans at a constant repetition frequency such that the surface deformation at each image point is at least substantially reduced during the interval between each scan.

2. A method of reproducing an image composed of a sequence of image points which follow in random succession in time and place, comprising the steps of scanning an electron beam in a cycle of scans across a light modulating surface in a schlieren-optical system in order to deposit electrostatic charges at discrete image points on said surface so as to deform said surface in accordance with said image, projecting light onto said surface in order to modulate said light in accordance with said deformed surface, confining the charge deposited at each individual image point to the area of said image point, applying trapezoidal voltage to a focus modulating system of a cathode ray tube so as to alternately over-focus and under-focus the electron beam and to deposit at least one secondary charge on the surface of said modulating surface in the area surrounding each image point, adjusting the slope of the flanks of the trapezoidal voltage so that the focus of the electron beam passes through the image plane at a required speed, and repeating said cycle of scans at a constant repetition frequency such that the surface deformation at each image point is at least substantially reduced during the interval between each scan.

3. The method as claimed in claim 2, wherein the frequency of the trapezoidal voltage is selected to have no common sub-multiple with the image repetition frequency.

4. The method as claimed in claim 2, wherein the amplitude of the trapezoidal voltage is controlled by reference to the scanning speed.

References Cited

UNITED STATES PATENTS

| | | | |
|---|---|---|---|
| 2,817,042 | 12/1957 | Williams | 315—12 |
| 3,385,927 | 5/1968 | Hamann | 178—7.50 |

ROBERT L. GRIFFIN, Primary Examiner

HOWARD W. BRITTON, Assistant Examiner

U.S. Cl. X.R.

178—7.87; 315—12, 31; 350—161